United States Patent [19]

Amano

[11] Patent Number: 4,531,150
[45] Date of Patent: Jul. 23, 1985

[54] IMAGE DISPLAY SYSTEM

[75] Inventor: Tadashi Amano, Hachioji, Japan

[73] Assignee: Konishiroku Photo Industry Co., Ltd., Tokyo, Japan

[21] Appl. No.: 439,429

[22] Filed: Nov. 5, 1982

[51] Int. Cl.³ .............................................. H04N 1/46
[52] U.S. Cl. ........................................ 358/76; 358/80
[58] Field of Search ....................... 358/76, 78, 80, 54

[56] References Cited
U.S. PATENT DOCUMENTS
4,364,084  12/1982  Akimoto et al. ...................... 358/76

Primary Examiner—Richard Murray
Attorney, Agent, or Firm—Finnegan, Henderson, Farabow, Garrett & Dunner

[57] ABSTRACT

The present invention relates to an image display system, and more particularly to an image display system intended for use in the artificial diagnosis of requirements for the determination of print exposures in making prints from the images on a photographic film.

4 Claims, 3 Drawing Figures

IMAGE DISPLAY SYSTEM

BACKGROUND OF THE INVENTION

In the first place, the printing from a color negative film will be explained below:

Generally speaking, an image plane of a color negative film has light and shade distribution, and the distribution of colors with blue, green and red densities differing according to various parts of the image plane, and said image plane is not necessarily considered to have been obtained by an appropriate exposure of the negative film, so that in the printing process, print exposures should be controlled according to the requirements for the negative film to be printed.

In most cases, however, color-balanced and print exposure-well-controlled color printing operations are practiced by controlling constant the transmission light quantities of the three-color components of blue, green and red in the entire area of an image. This is based on such an empirical rule that the three-color average reflectance obtained by integrating the entire scene is nearly constant in usual photographing scenes. Those skilled in the art call this "the gray integration printing method". Namely, when a normal, neutral subject is photographed on a color negative film, the large area transmittance density varies according to over- or under-exposure, the quality of a light source used in the photographing, the sensitivities of the blue-, green- and red-sensitive layers of the color negative film, the presence of a mask, and the like, and such variations are automatically controlled by keeping the exposures by blue, green and red lights constant at the time of the printing exposure operation.

In contrast to this, the change in the three colors of a color negative image caused due to the different distribution of the colors of a subject, since it leads to the change in the areal three-color component ratio of the subject, is of such a nature as not to be automatically controlled by such the conventionally practiced method as aforementioned.

And, the change in the densities of a negative film occurring in the case where a light-shade composition is extremely biased compared with normal light-shade distributions such as where the highlight area is extremely large or small as compared with normal scenes; for example, where a majority of the area of a scene is composed of shades or of highlights, is due to the areal change in the densities of a subject. In that case, therefore, the printing cannot be compensated by the conventional method that controls the printing merely according to the large area transmittance density. In addition, in the case where a principal subject is composed of extreme shadows or of extreme highlights as compared with other subjects surrounding the principal subject, the printing can not be compensated, either, because the set condition of the printer differs largely from the composition of such a scene.

Among the skilled in the art, the result obtained by photographing such a scene as to produce a color-unbalanced print is called the "color failure", while the result obtained by photographing such a scene as to produce an unsatisfactory density-having print is called the "density failure". Frequencies of the occurrence of such failures, although they vary according to seasons, are said to be around 5% for the color failure and from 30 to 40% for the density failure. For automatic correction of the color failure, the lowered correction method, etc., has been adopted and made a practical reality.

For automatic correction of the density failure, there have been proposed a method which is such that principal part of an image is finely divided into parts among which the highest density-having part is selected as one that represents the principal subject, and the functional relation between the highest density and the peripheral densities is used to determine a correcting quantity, and another method for determining a printing density by positionally weighting.

At the present time, in the printing by use of these probability procedures, the gray integration printing method produces 30 to 40% defective prints, and even the automatic negative judgement method wherein a negative image is finely devided into parts whose densities are used to determine a print exposure produces 5 to 10% defective prints. Besides, aside from such defects in print exposure, there are a few percent prints that are not allowed to be shipped because they are such faulty images as unexposed frame, blurred image, out-of-focus image, and the like.

Faulty image prints, if found before shipping and the shipping thereof is stopped, leads to only the loss of photographic papers. However, defective prints are usually reprinted and shipped. The reprinting operation process comprises finding defective prints, looking for the original negatives of the defective prints to conduct the reprinting thereof, and, after inserting the processed prints into the preceding group of prints. Even if there is only one defective print, the lot of prints to which the print belongs is not allowed to be shipped, so that the printing operation process becomes largely confused. Furthermore, the reprinting operation, because of the above-described procedures, require enormous time and labor as compared to the first printing operation process.

For this reason, measures are taken to prevent the occurrence of defective prints. A most generally conducted measure is such that a skilled operator is stationed at the printer (exposure section), and he checks one image after another of negative films to change print exposure for negative films that are likely to produce defective prints. For example, since an image having a principal subject (such as a portrait) as a highlight area surrounded with a dark area as in a strobe-scopic scene tends to produce a flat-toned print in the gray integration printing method for the reason described above, the operator perceives the dark area and the density of the principal subject to classify the negative image to thereby determine an appropriate print exposure according to his experience. And in the case of an image in which colors vary areally as in such a scene as of a red carpet, the gray integration printing method renders the entire area neutral-toned, so that the color of the red carpet cannot be reproduced as really red in a printed image. In that case, the operator changes the print exposure balance of red, green, and blue lights on the basis of his experience to thereby produce a print.

To enable such a printing control, an ordinary printer is provided with keys each having a geometrical exposure change range of from 20 to 10%, and the operator experiences which key should be selected from the keys in order to produce a satisfactory print, and on the basis of the experience, the operator makes key selections in the routine printing process. As the operator becomes most skillful in the operation of the printer, he becomes able to reduce the rate of making defective prints to a few percent. As means to effectively employ these skilled operators, the judgement of negative film image qualities is provided independently of the printer, and according to the results of the judgement, unmanned automatic operations of the printer may be carried out—this has been made a practical reality. Further, in order to minimize the loss of prints likely to be produced as a result of the determination of print exposures by use of the earlier-mentioned scanned densities, a measure is taken to have the operator judge negative image qualities in advance in the stage prior to the printer operation. These measures require skilled operators on condition that the image quality judgement is made artificially on one frame by one frame with the estimation by the operator of automatically controlled results in the printer.

On the other hand, exposure-determining devices which employ a video system are practically used. A typical example of such devices is a device having a flying spot scanner as a light source which scans the entire area of a negative film image to photoelectrically detect the change in the quantity of light corresponding to the densities of the negative image, and the photoelectric signals are reversed to thereby reproduce a positive image on a CRT screen. The observer, viewing the positive image on the CRT screen, if the image is darker on the whole, changes and controls the quantity of the light of the flying spot scanner so as to reproduce a visually satisfactory image. The value obtained by the control of the quantity of the light is used as the quantity of light for use in the printing process. The same principle may be applied to both color and black and white printing processes. This has been used in the determination of print exposures for making professional prints (large format prints), but the acceptable ranges of the independent judgement of each frame image and of the color adjustment and luminance adjustment of the CRT screen image, because the human eye becomes adapting to the CRT screen image, becomes so wider that the operator needs to become more skillful to be able to cause the adjusted level to correspond with the print exposure. And the judgement of image qualities one frame by one frame requires enormous time, so that it is not adopted in the process of making prints for general users.

SUMMARY OF THE INVENTION

It is an object of the present invention to provide an image display system which is free from the above-described disadvantages and which requires no skilled operator for the determination of print exposures.

The above object of the present invention is accomplished by an image display system comprising a display means for a plural of images in different positions, an observation means for said images, an image designation means for an image in the images, and a memory means for an information of the designated image.

A primary feature of the present invention is to display a plurality of images on a display screen; that is, it is not that each of the images successively photographed on a film is displayed one by one on the screen but that a plurality of images are displayed together to be observed on a single display screen, whereby:

(1) the extent of the adaptation of the human eye to the screen image caused by observing one frame by one frame can be reduced by the comparative observation of a plural number of images, thus enabling the observer to readily find a defective image from among the plural number of images, and (2) the probability of producing defective prints in the integrating neutral process is from 30 to 40% as has been mentioned earlier, whereas the probability of producing defective prints in the printer by use of the scanned densities is not more than 10%.

Instantly finding a defective image from among a plural number of images is much easier than in the manner of observing one frame by one frame, and all needs to be done is to take action on the defective frame, so that the operation may be easily carried out.

A second feature of the present invention comprises means to designate the observed defective image from a plurality of displayed images, to provide the visually judged information on the images, to cause the defective image to correspond with the visually judged information on the defective image, and to memorize the information on the corresponding relation.

DETAILED DESCRIPTION OF THE PREFERRED EMBODIMENT

Figure 1:
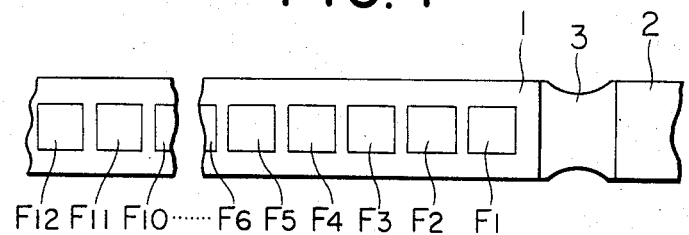
FIG. 1 shows a successively connected long photographic film roll.

FIG. 1 shows a photographic film for general use in which images are photographed in a long row wherein from F1 to F2 are image frame numbers on a film arbitrarily designated from the leading end thereof. In the photographic process, it is customary to connect a number of films one after another by pieces of an adhesive tape into one long roll to be processed. In the drawing, a film 1 is connected with another film 2 by an adhesive tape 3.

Figure 2:
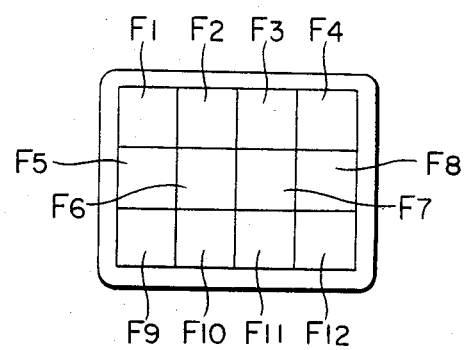
FIG. 2 shows an example of the display system of the present invention.

FIG. 2 shows that above images are represented twelve images on the display, and operator observes the images on the display.

Figure 3:
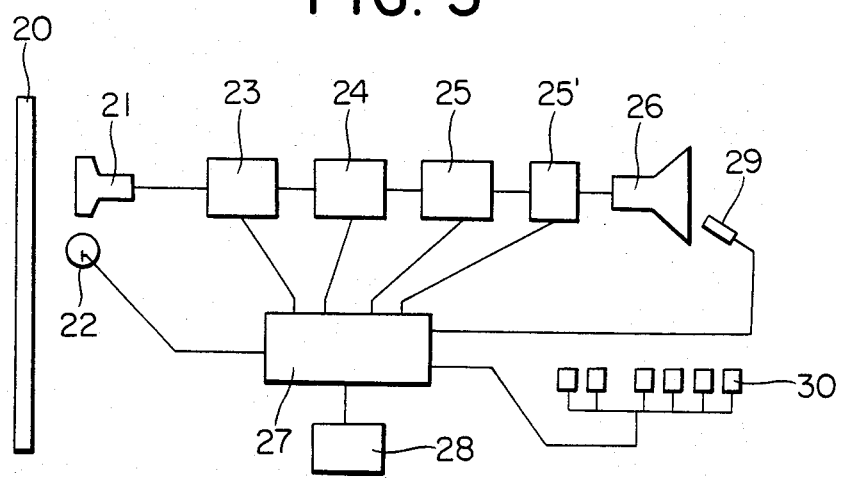
FIG. 3 shows a block diagram showing an example of the present invention.

FIG. 3 shows an example of the present invention. In the figure, numeral 20 is a film in the long strip form in which, for example, such images as shown in FIG. 1 are formed in succession. Film scanning means, such as a video camera 21, scans images coming successively into the visual field and transmits the video signal to image processing means, such as an image processing circuit 23. In the image processing circuit 23, an image reproduction level is set to the condition which is to be determined according to such parameters as the negative-to-positive reversal, the quantities of transmission light from a detector 22.

For example, when the quantity of the transmission light through the detector 22 is controlled so as to be constant to image frames F1 to F12 of the negative film, the reproduction system in the integrating neutral process is completed, and if the print exposure information by the density scanning is fed so as to correspond to each image into the system, the print reproduction system in the system can be observed.

Further, it is naturally possible to set the image reproduction level by using the image video signal itself; that is, the video signal for one image is integrated, then a signal proportional to the transmission light through the detector 22 can be obtained, the printing information by the density scanning according to each portion (position) of the image is operated, the reproduction system is then determined, and image plane can be observed.

External information input-output means such as an external information input-output circuit 27 is connected with the detector 22, a manual information input section 30, external memory means such as an external memory 28 and manually operable means such as a light pen 29, and said circuit feeds a reproduction level control signal, such as the average quantity of light to each image, into an image processing circuit 23. And an image-processed signal from image processing circuit 23 is memorized in A/D conversion means such as an A/D converter 24 and in image memory means such as a memory circuit 25. The memory circuit 25 is also connected with the external information input-output circuit 27, and the foregoing signal, as shown in FIG. 2, is memorized in the in-advance-designated memory address.

Thus, the images that have come in succession into the camera field are sequentially memorized in the memory circuit 25, and when the specified number of images (12 images in this example) have been memorized, the memorized images are transferred to an auxiliary memory 25'.

The output from the auxiliary memory 25' is scanned overall to be displayed on display means such as a CRT display screen 26, which can be observed in the matrix form as shown in FIG. 2. Light pen 29 is intended for use in pointing an image out of the images displayed on the CRT screen, and the image position designated by the external information input-output circuit 27 can be judged automatically. To the judged image such visual information on the faulty image as blur, empty frame, and the like, or on the light and shade is provided by depressing key bottons 30 to thereby memorize the combined information in the external memory 28.

In accordance with the memorized information, a judgement is made on whether the defective image should not be printed or the image defective in the light and shade should be printed with changing the control of the printing, but the problem of such controls is out of the scope of the present invention, so that details of it are omitted in the present invention.

Explained above is an example wherein images are lined up in a row in the single roll form, but it is also possible to take several rolls of images with a plurality of video cameras to display a plurality of images on a single CRT screen for observation. Such an application is suitable for the integrated data processing in the printing operation.

As has been described above, the print exposure determination with use of scanned densities produces a few percent defective prints, the probability of making defective prints is concentrated in those including negatives whose transmission densities are extremely high or low, subjects whose contrast is extremely high or low, and negatives whose blue-green-red transmission light quantity balance is largely unbalanced. The negative film having the image frame printing defective print accounts for 20 to 30% in the whole. The above characteristics may be readily characterized by a simple photometric techniques, that is, it is possible to select a group of images having a high probability to produce satisfactory prints by the measurements of the average densities of negatives and of the highest and lowest densities of images.

If such a manner as mentioned above is taken, the human judgement can be minimized not by displaying all images but by displaying the group of negatives highly likely to produce defective prints, and this manner is especially desirable for the converging observation. In general observations of a negative film, a negative film is observed under a given quantity of light (tungsten light or fluorescent light), while it requires a high skill to select the defective print from among those printed by a transmission light quantity-controlled printer. If, however, the image reproduction level is varied independently according to each transmission light quality to make the transmission light quantity constant, then the results can be very easily observed, thereby enabling to estimate without any skill whether resulting prints would be too dark or too washy. The determination of the printing according to scanned densities is so complex that it is impossible to make prejudgement without knowing the judgement theory. However, according to the present invention, observation of image which is changed reproduction level of the image according to the printing condition determining quantities by the scanned densities can be exactly presented defective prints whether prints to be produced would be too dark or too washy without knowing the printing condition determining formula on the basis of scanned densities and to estimate positively.

Although the image display, whether positive or negative, may be basically accepted by the observer, it is considered easier for those unskilled to observe the positive image display. Further if a color image display is used, both the color balance, and the light and shade can be perceived. However, generally speaking, it is very difficult to judge the color balance condition on a CRT display, and particularly it takes time for those unskilled to judge the condition, while, on the other hand, in the case of the color printing process, it is very easy to conduct an automatic control of the color balance according to the red-green-blue transmission light quantity ratio of a negative film. As means for this there are known the lowered correction, and the like, which are well-known to those skilled in the art.

However, if a variation of color balance of negative film which is exposed imagewisely in the tungsten light (or fluorescent light) without using any artificial light such as flash exposure is controlled automatically according to the ratio of transmission light quantities, the defective print is produced from the negative film. As an applied example of the present invention, an image is reproduced with black-and-white-toned luminances on the display, and the operator judges only the luminance (the light and shade of the image). In this manner, the observer can easily judge the image independently of the color balance. The color balance information is displayed on the CRT screen with frame marking surrounding an image that is characterized to be of an artificial light by the blue, green, and red light transmission densities thereof. An image of a scene which tends to be mistaken for what has been photographed in an artificial light, particularly in a tungsten light, is such an image having an yellow area-dominant scene, and in a fluorescent light, is such an image of a scene which is mostly occupied by trees with green leaves. Namely, tungsten light has high energy in the red region, while fluorescent light has high energy in the green region, so that an artificial-light scene can be easily characterized by the proportion of blue, green and red light quantities.

In most scenes, it is very rare to find those containing objects that reflect the same energy distribution as that of tungsten light, but there are a large number of scenes containing objects that reflect equivalent energy distribution to that of fluorescent light. It is very easy to judge whether to accept or reject an image obtained by displaying on the CRT screen what has been characterized to be of an artificial light among such scenes; that is, judgement can be made on whether to accept or reject what has been characterized to be of artificial light from the proportion of blue, green and red light quantities as well as from the commonsense point of view that artificial light is used indoors, where there exist no subjects such as having large surface areas with overall uniform luminance, and artificial-light scenes are non-tree and non-grass scenes.

Thus, the reproduced image is displayed a luminant reproduced image, the observer observes only the light and shade of the luminant reproduced image, image that has been selectively characterized from the blue, green and red light quantities displays together with the luminant reproduced image, whereby the observer is easily able to find a defective image likely to produce a defective print. Thus, this is a very effective application example of the present invention. The light-and-shade information has been explained as means to provide a criterion for the judgement of an image, but key buttons 30 in FIG. 3 are means designed so as to enable to obtain a reproduction level changing signal, to designate an independent image on display, to change the reproduction level independently, and to memorize the visually reproduction level, which are also an applied example of the present invention.

The visual information has been explained as means to characterize the whole defective nature of an image such as an insufficient light-and-shade balance, faulty image, etc., but the subsequent application example of the present invention is a method for the designation of a principal subject by the observer.

In FIG. 3, the position of a principal subject of the image displayed on the CRT display is designated by the observer by use of light pen 29. The position is digitalized and supplied to the density scanning type printer. Consequently, print exposure is determined on information relating to the density of principal subject. The judgement according to scanned densities tends to cause a faulty evaluation such as in a rear-light scene because a principal subject is misjudged in probability as a highlight portion, or in other errors because no principal subject is in the center of an image, but the supply of information on the position of a principal subject makes possible the highly accurate determination of the printing condition.

The characteristics including applied examples have been described in above, but the present invention is such that a plurality of images are displayed on a single CRT screen to thereby minimize the adaptation of the observer's eye thereto and, besides, the screen size is such as to render the movement of the eye fall under an appropriate angular range to thereby minimize the fatigue of the observer. In addition, the comparative observation system enables the observer to increase the accuracy of his judgement, and on the other hand, the use of an image display system having means to designate a defective image from among the plurality of images observed herein and memory means to memorize the information on the designated defective image corresponding to the printing information thereof enables to prevent the production of defective prints as well as to eliminate the labor of reprinting operations.

The present invention is a very useful invention for photographic printing processes, which may also be applied to the black-and-white printing process.

What is claimed is:

1. An image display system comprising:
    film scanning means for scanning color images on a film and generating a video signal;
    image processing means for transmitting the video signal in accordance with the scanning of the film scanning means;
    external information input-output means for feeding a reproduction level control signal into the image processing means to produce an image processed video signal;
    an A/D conversion means for converting the image processed video signal from the image processing means into a digital video signal;
    image memory means for temporarily memorizing the image processed digital video signal;
    display means for displaying a plurality of images memorized in the image memory means;
    manually operable means for indicating the position of a principal subject of the images on the display means and generating a signal indicative of said position; and
    external memory means for memorizing the signal from the manually operable means.

2. The image display system as claimed in claim 1 wherein the display means includes means for displaying a representation of the color images on the film in black and white tones whereby an observer judges the images independent of color balance.

3. An image display system for use in determining the proper print exposure in making prints from color images on a photographic film comprising:
    film scanning means for scanning the color images on the film and transmitting a video signal of the images on the film;
    external information input-output means for generating a reproduction level control signal;
    image processing means responsive to the video signal and the reproduction level control signal for generating an image processed video signal in analog form;
    A/D conversion means responsive to the image processed video signal for converting the image processed video signal from analog into digital form;
    image memory means responsive to the image processed video signal for storing and transmitting the image processed signal;
    display means responsive to the stored image processed video signal for displaying a representation of the images on the film;
    manually operable means for indicating a position representative of a designated principal subject of the images displayed on the displaying means, generating and transmitting an indicating signal representative of the position; and
    external memory means responsive to said indicating signal for storing the indicating signal.

4. A method of determining the proper print exposure in making prints from color images on a photographic film comprising the steps of:
    scanning the color images and transmitting a video signal of the color images;
    displaying the color images from the video signal on a video monitor;
    indicating the position of a principal subject on one of the displayed color images; and
    determining the density of said color image in the indicated position of the principal subject for use in determining the proper print exposure in making a print from said color image.

* * * * *